(12) United States Patent
Shimizu

(10) Patent No.: US 9,412,168 B2
(45) Date of Patent: Aug. 9, 2016

(54) IMAGE PROCESSING DEVICE AND IMAGE PROCESSING METHOD FOR CAMERA CALIBRATION

(75) Inventor: Seiya Shimizu, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 981 days.

(21) Appl. No.: 13/325,703

(22) Filed: Dec. 14, 2011

(65) Prior Publication Data

US 2012/0081512 A1 Apr. 5, 2012

Related U.S. Application Data

(63) Continuation of application No. PCT/JP2009/061127, filed on Jun. 18, 2009.

(51) Int. Cl.
| | | |
|---|---|---|
| *H04N 7/00* | (2011.01) | |
| *G06T 7/00* | (2006.01) | |
| *G06K 9/00* | (2006.01) | |

(52) U.S. Cl.
CPC .......... *G06T 7/0042* (2013.01); *G06K 9/00798* (2013.01); *G06T 7/0018* (2013.01); *G06T 2207/10016* (2013.01); *G06T 2207/30252* (2013.01); *G06T 2207/30256* (2013.01)

(58) Field of Classification Search
CPC .......................... G06K 9/00798; G06T 7/0042
USPC .......................................................... 348/36
See application file for complete search history.

(56) References Cited

U.S. PATENT DOCUMENTS

| | | |
|---|---|---|
| 5,638,116 A | 6/1997 | Shimoura et al. |
| 5,739,848 A | 4/1998 | Shimoura et al. |
| 6,456,730 B1 | 9/2002 | Taniguchi |
| 7,787,659 B2 * | 8/2010 | Schultz et al. ................. 382/106 |
| 2003/0016287 A1 * | 1/2003 | Nakayama et al. ........... 348/148 |
| 2008/0007619 A1 * | 1/2008 | Shima .................... G06T 7/0018 348/118 |
| 2010/0231731 A1 * | 9/2010 | Motomura .......... H04N 5/23248 348/208.4 |

FOREIGN PATENT DOCUMENTS

| | | |
|---|---|---|
| JP | 7-77431 | 3/1995 |
| JP | 9-189517 | 7/1997 |
| JP | 2000-11133 | 1/2000 |
| JP | 2000-242899 | 9/2000 |
| JP | 2001-225709 | 8/2001 |

(Continued)

OTHER PUBLICATIONS

International Search Report mailed Aug. 25, 2009 issued in corresponding International Patent Application No. PCT/JP2009/061127.

*Primary Examiner* — Richard Torrente

(74) *Attorney, Agent, or Firm* — Staas & Halsey LLP

(57) ABSTRACT

In a calibration device, an image-integration averaging processing unit integrates/averages an image so as to generate an integrated and averaged image, and an edge extracting unit extracts the edges from the integrated and averaged image. A vanishing-point extracting unit calculates vanishing lines by using the edges and identifies the coordinates of the intersection point of the vanishing lines as the coordinates of the vanishing point. An error determining unit compares the coordinates of the current vanishing point with the coordinates of the previous vanishing point so as to determine whether a parameter of the camera needs correcting. In accordance with the result of the determination, a correction processing unit corrects a parameter of the camera.

9 Claims, 13 Drawing Sheets

(56) References Cited

FOREIGN PATENT DOCUMENTS

| JP | 2002-259995 | 9/2002 |
| JP | 2003-329411 | 11/2003 |
| JP | 2004-205398 | 7/2004 |
| JP | 2008-11174 | 1/2008 |

* cited by examiner

FIG.10
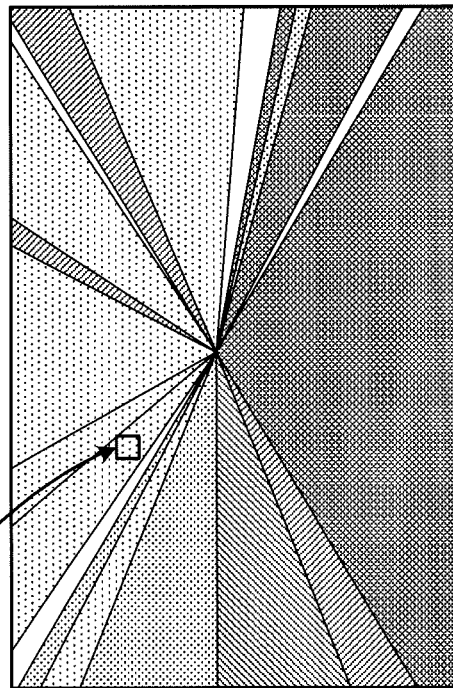
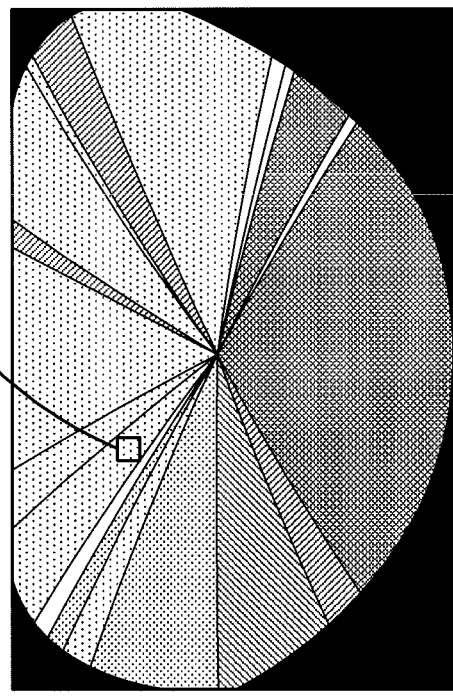

IMAGE PROCESSING DEVICE AND IMAGE PROCESSING METHOD FOR CAMERA CALIBRATION

CROSS-REFERENCE TO RELATED APPLICATION

This application is a continuation of International Application No. PCT/JP2009/061127, filed on Jun. 18, 2009, the entire contents of which are incorporated herein by reference.

FIELD

The embodiments discussed herein are directed to an image processing device, or the like, that processes images.

BACKGROUND

A technology has spread in recent years that uses images captured by a plurality of cameras installed on the circumference of a movable body and that displays an overhead (bird's eye) view that includes the image of the movable body taken from above or displays a 360-degree panoramic image by combining images. To convert the image captured by the camera into an overhead view, or the like, or to display a panoramic image by combining images, the parameters that are used include the positions (coordinates x, y, and z) of the camera, the angles (the depression angle $\psi$, the rotation angle $\phi$, and the pan angle $\theta$) of the camera, and the like.

To install a camera on a movable body, because each parameter of the camera is different depending on the installation condition and because of installation errors, calibration needs to be performed in order to correctly determine each parameter of the camera. The camera, which is installed on the movable body, is calibrated by using a special jig before shipment. However, the parameters of the camera gradually change due to degradation with aging after shipment and due to degradation of the area where the camera is installed.

For example, a change in the angle of the camera changes the result of calculating the distance between the camera and an object that is extracted from the image, which results in the incorrect displaying of an overhead image or panoramic image. Therefore, it is desirable to calibrate the camera after shipment. Because it is difficult to use a special jig after shipment, it is preferable to calibrate the camera without using a special jig.

A disclosed technology for performing calibration after shipment involves extracting the right and left white lines of the straight road along which the movable body is moving and calibrating the camera by using the extracted white lines. Another well-known technology involves calibrating the camera by using the geometric shape of a sign painted on the road surface.

Japanese Laid-open Patent Publication No. 2003-329411
Japanese Laid-open Patent Publication No. 2001-225709
Japanese Laid-open Patent Publication No. 2008-11174
Japanese Laid-open Patent Publication No. 2000-11133
Japanese Laid-open Patent Publication No. 2004-205398

The above-described conventional technology is based on the assumption that the road surface is flat in the image captured by the camera and that the white line or the painted sign satisfies an assumed shape. If these assumptions are not satisfied, there is a problem in that the conventional technology is not used.

Even if the white line or the painted sign satisfies the assumed shape, the conventional technology is not also used when the white line or the painted sign is concealed by a different vehicle. In an actual traffic environment, a situation often occurs where the white line or the painted sign is distorted or is concealed by a different vehicle.

Therefore, there are many situations where calibration is not performed even if a parameter of the camera is incorrect; thus, calibration is not correctly performed.

SUMMARY

According to an aspect of an embodiment of the invention, an image processing device includes an integrating unit that acquires, from a camera installed on a movable body, images that are captured by the camera while the movable body is moving and integrates the acquired images so as to generate an integrated image; a vanishing-point identifying unit that extracts brightness edges from the integrated image and identifies an intersection point of lines determined by using the brightness edges as a vanishing point; and a determining unit that determines whether a parameter of the camera has an appropriate value by using the coordinates of the vanishing point and reference coordinates.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 10 is a diagram that illustrates a process performed by a lens-distortion correcting unit;

DESCRIPTION OF EMBODIMENTS

Preferred embodiments of the present invention will be explained with reference to accompanying drawings. The present invention is not limited to those embodiments.

[a] First Embodiment

Figure 1:
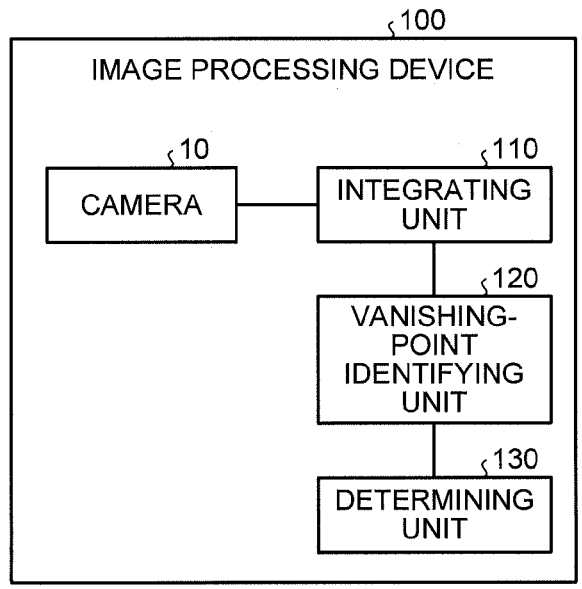
FIG. 1 is a diagram that illustrates the configuration of an image processing device according to a first embodiment.

FIG. 1 is a diagram that illustrates the configuration of an image processing device according to a first embodiment. As illustrated in FIG. 1, an image processing device 100 includes a camera 10, an integrating unit 110, a vanishing-point identifying unit 120, and a determining unit 130.

The integrating unit 110 is a processing unit that acquires, from the camera 10 installed in a movable body, images that are captured while the movable body is moving and that integrates the acquired images so as to generate an integrated image.

The vanishing-point identifying unit 120 is a processing unit that extracts the brightness edges from the integrated image, determines lines by using the brightness edges, and identifies the intersection point of the lines as the vanishing point.

The determining unit 130 is a processing unit that determines whether a parameter of the camera has an appropriate value by using the coordinates of the vanishing point and the reference coordinates.

In the above-described image processing device 100, because the vanishing point is obtained from the integrated image, it can be determined, regardless of an actual traffic environment, whether calibration needs to be performed on the camera after shipment.

[b] Second Embodiment

Figure 2:
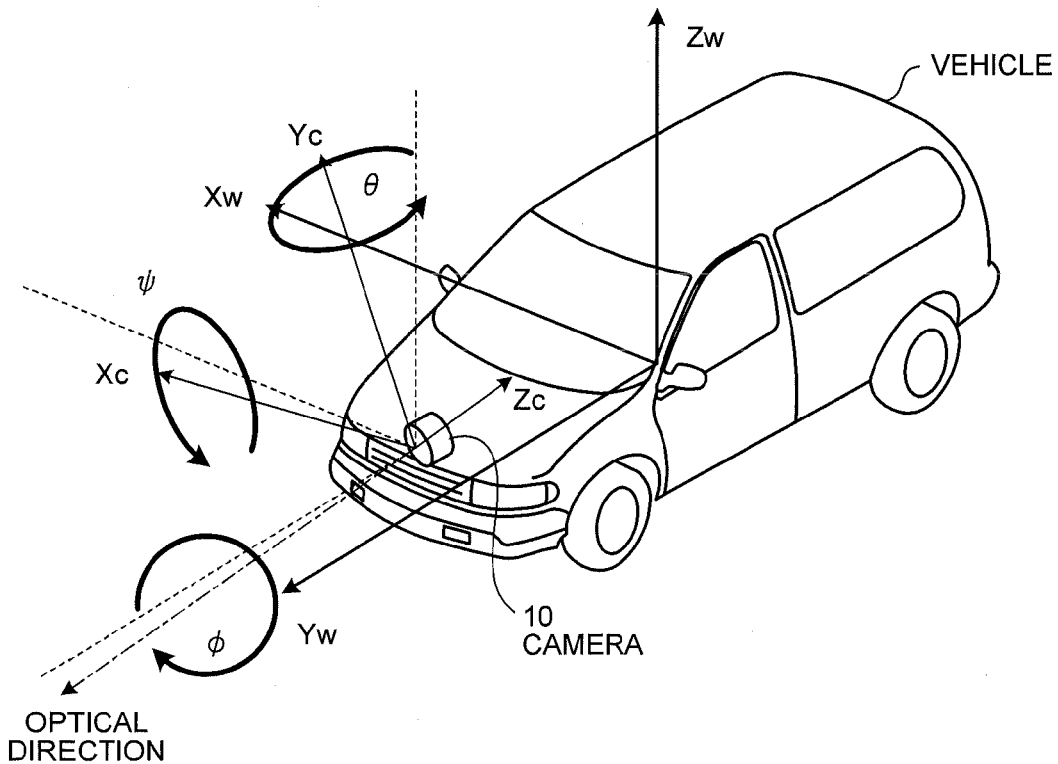
FIG. 2 is a diagram that explains the parameters of the camera.

An explanation is first given of the parameters of the camera. FIG. 2 is a diagram that explains the parameters of the camera. As illustrated in FIG. 2, the parameters of the camera 10 include, with respect to the axes X, Y, and Z of the camera coordinate system with the origin at the camera 10, the depression angle $\psi$, which indicates the angle of rotation around the axis X of the camera, the rotation angle $\phi$, which indicates the angle of rotation around the axis Z, and the pan angle $\theta$, which indicates the angle of rotation around the axis Y. The axis Z corresponds to the optical axis of the camera 10.

Figure 3:
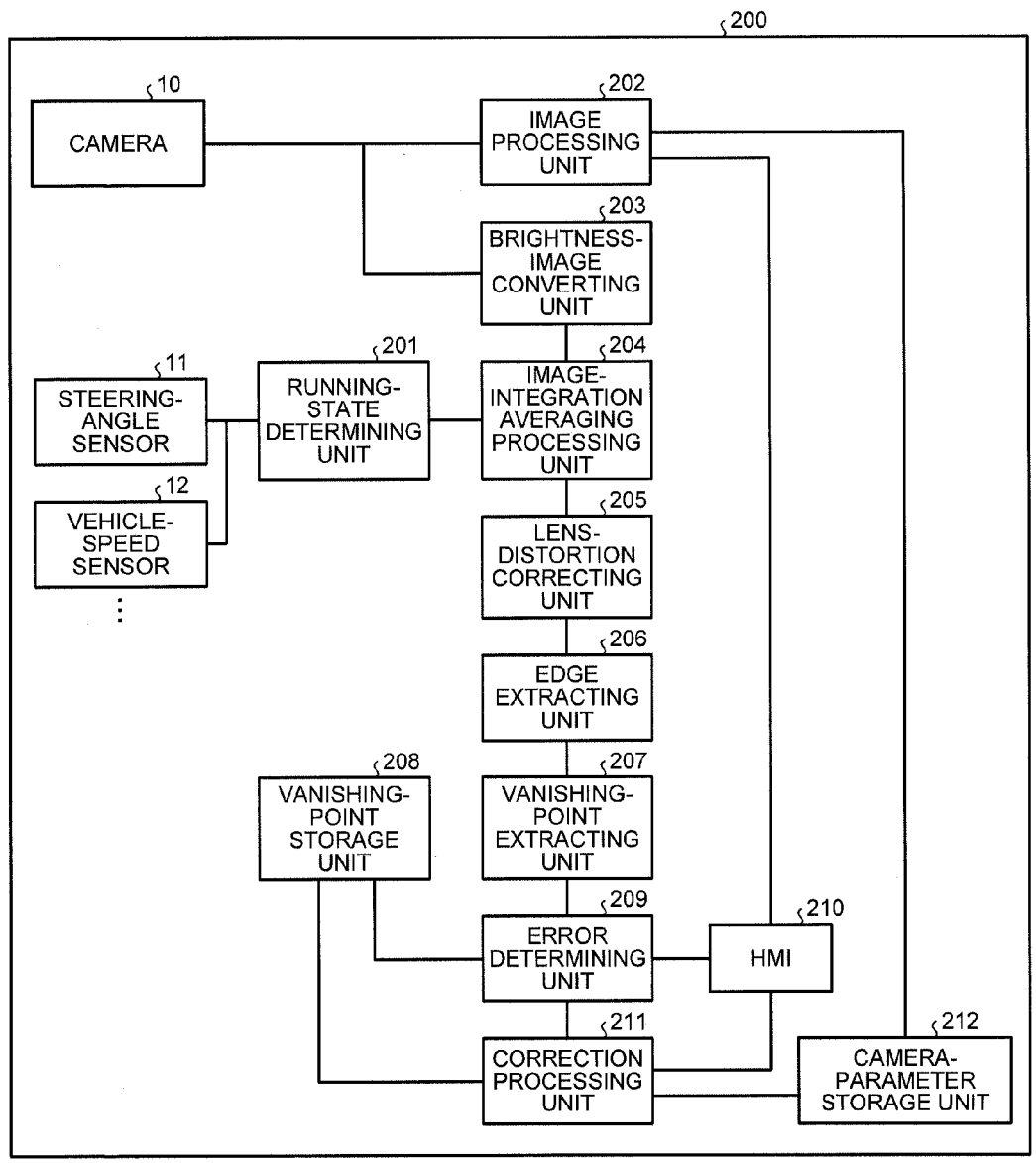
FIG. 3 is a diagram that illustrates the configuration of a calibration device according to a second embodiment.

Next, an explanation is given of the configuration of a calibration device according to a second embodiment. FIG. 3 is a diagram that illustrates the configuration of the calibration device according to the second embodiment. As illustrated in FIG. 3, a calibration device 200 includes the camera 10, a steering angle sensor 11, a vehicle-speed sensor 12, a running-state determining unit 201, an image processing unit 202, a brightness-image converting unit 203, an image-integration averaging processing unit 204, and a lens-distortion correcting unit 205. The calibration device 200 further includes an edge extracting unit 206, a vanishing-point extracting unit 207, a vanishing-point storage unit 208, an error determining unit 209, an HMI (Human Machine Interface) 210, a correction processing unit 211, and a camera-parameter storage unit 212. The calibration device 200 is installed, for example, within a vehicle.

Figure 4:
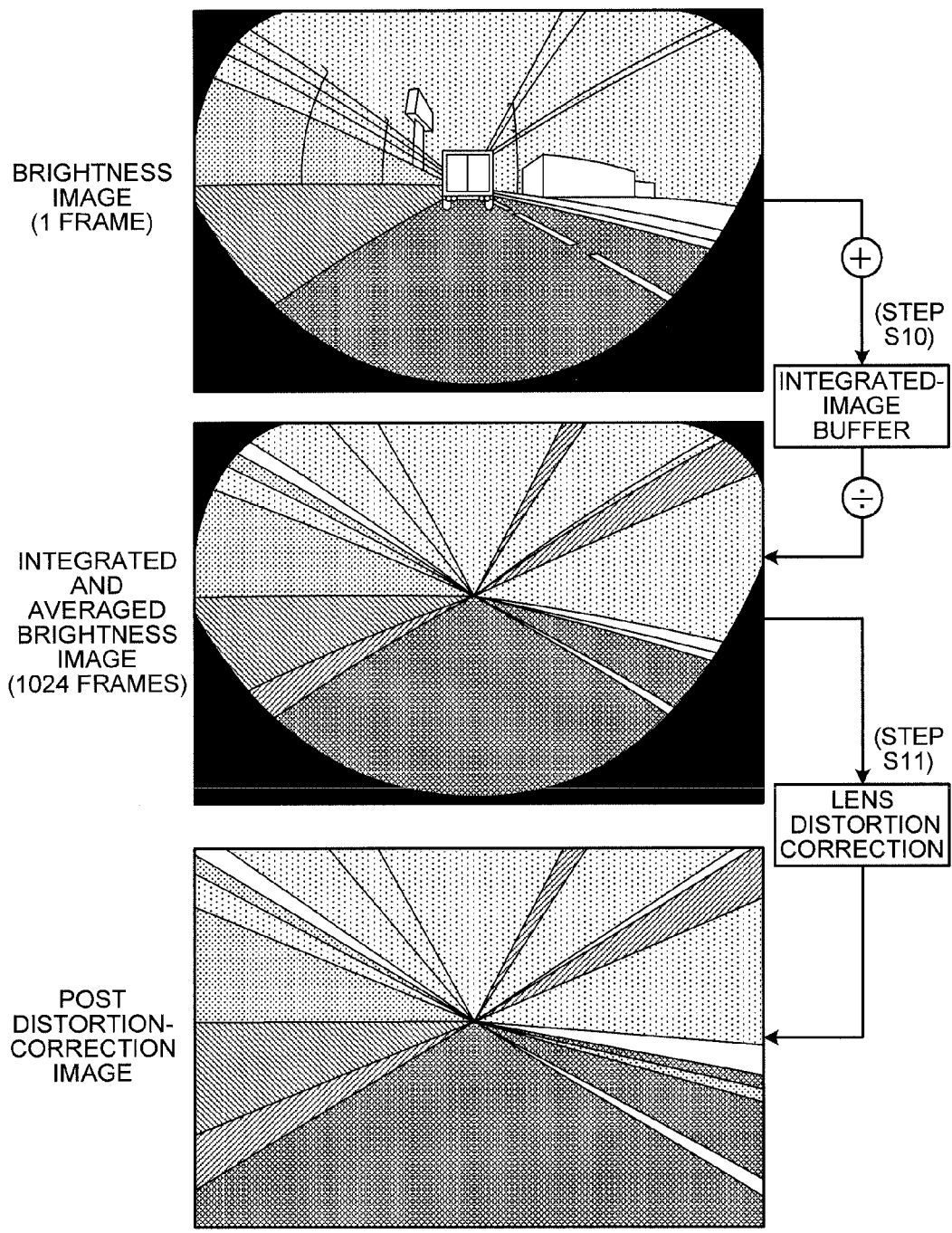
FIG. 4 is a diagram (1) that explains the outline of a process performed by the calibration device.
Figure 5:
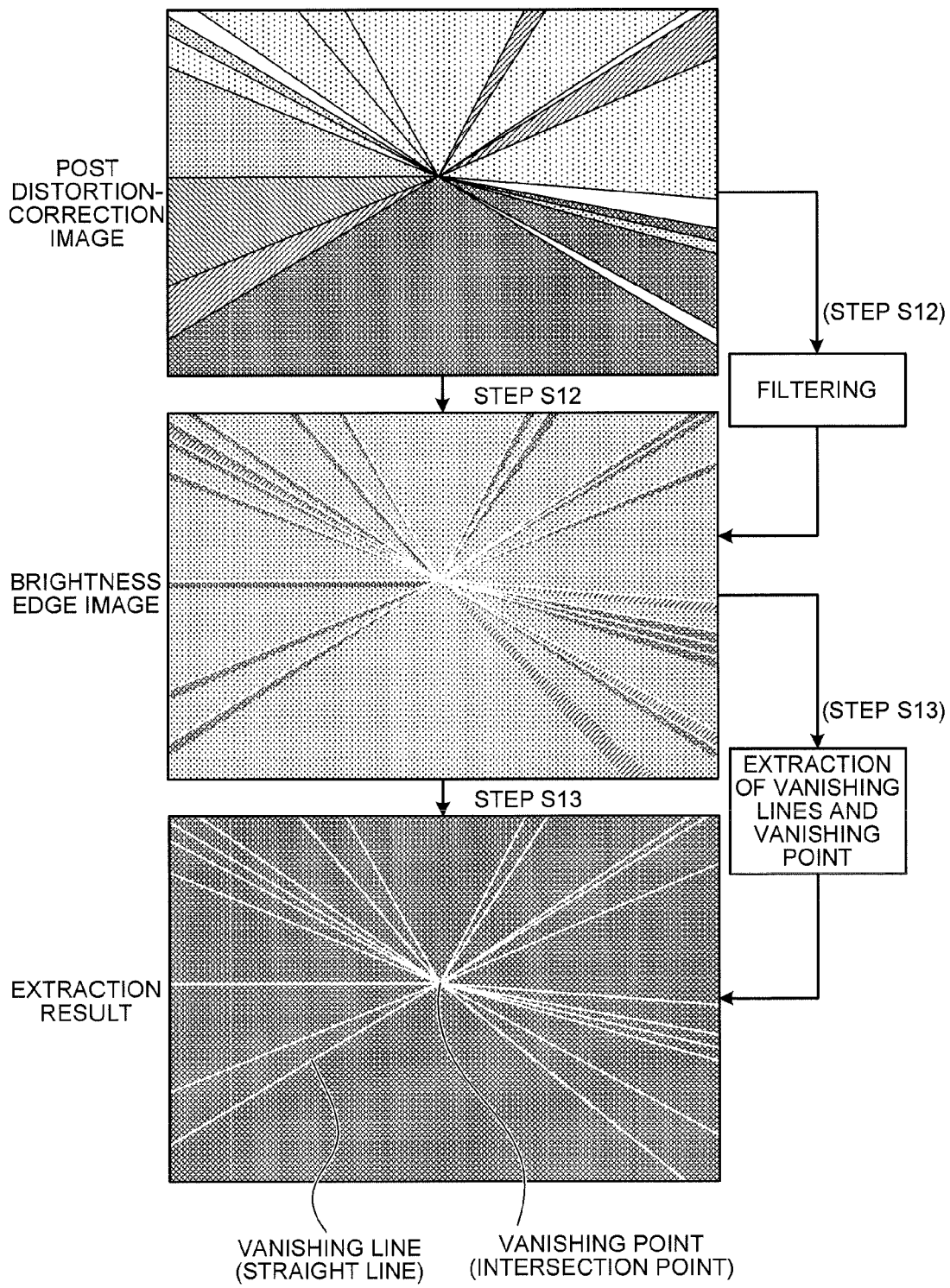
FIG. 5 is a diagram (2) that explains the outline of a process performed by the calibration device.

Before each processing unit is explained in detail, the outline of a process performed by the calibration device 200 will be explained. FIGS. 4 and 5 are diagrams that illustrate the outline of a process performed by the calibration device.

As illustrated in FIG. 4, the calibration device 200 integrates the images captured by the camera 10 and averages the integrated image so as to generate an integrated and averaged brightness image. In the following explanation, the integrated and averaged brightness image is described as an integrated and averaged image (Step S10). For example, the calibration device 200 according to the second embodiment integrates the images of 1024 frames and then divides the brightness value of each pixel of the integrated image by 1024 so as to generate an integrated and averaged image.

The calibration device 200 takes into account the lens distortion of the camera 10 and performs the lens distortion correction on the integrated and averaged image (Step S11).

Next, an explanation is given with reference to FIG. 5. After the lens distortion correction has been performed, the calibration device 200 performs a filtering process on the integrated image so as to extract the edges from the integrated and averaged image (Step S12). In the following explanation, the integrated and averaged image from which the edges have been extracted is described as an edge image.

The calibration device 200 calculates, as a vanishing line, the straight line that connects the point sequence of the edges included in the edge image. Furthermore, the calibration device 200 calculates, as a vanishing point, the intersection point of the vanishing lines (Step S13). The calibration device 200 compares the calculated vanishing point with the reference vanishing point. If the distance between the two vanishing points is equal to or greater than a threshold, it is determined that calibration needs to be performed.

Figure 6:
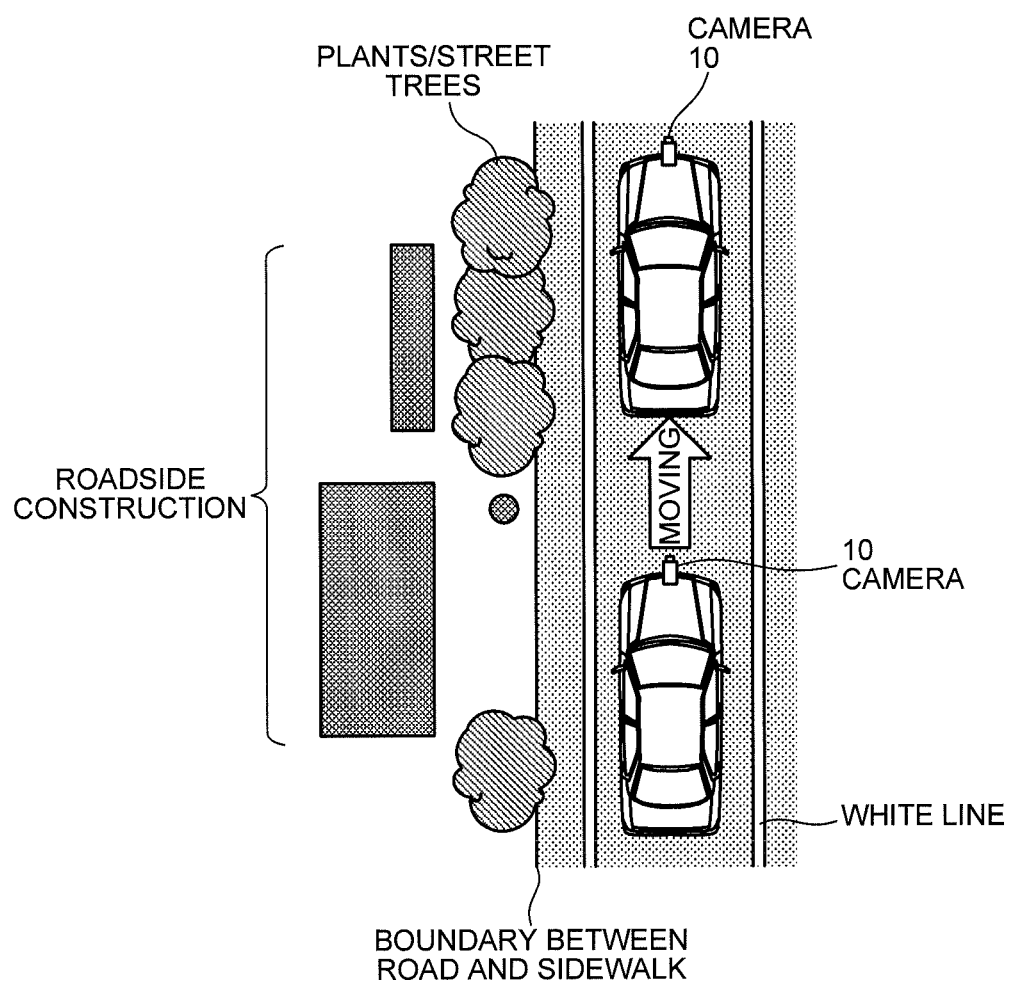
FIG. 6 is a diagram that illustrates a vehicle that is moving in a straight line.

FIG. 6 is a diagram that illustrates a vehicle that is moving in a straight line. Because a motionless object captured by the camera 10 installed in the vehicle moves, relative to the vehicle, in the opposite direction of the movement of the vehicle, the motionless object describes a trajectory in a direction parallel to the movement direction in the image captured by the camera 10. Therefore, if an integrated and averaged image is generated from the images captured by the camera 10, the brightness gradient extending in a direction that does not match the moving direction of the vehicle is averaged, and only the brightness gradient extending in a direction parallel to the moving direction remains strong, as illustrated in FIG. 4.

As illustrated in FIG. 5, if the calibration device 200 performs filtering on the brightness gradient so as to determine the brightness edge, the brightness edge corresponds to the vanishing line that is generated due to the movement of the vehicle. The calibration device 200 calculates the intersection point of the vanishing lines so as to determine the vanishing point.

Figure 7:
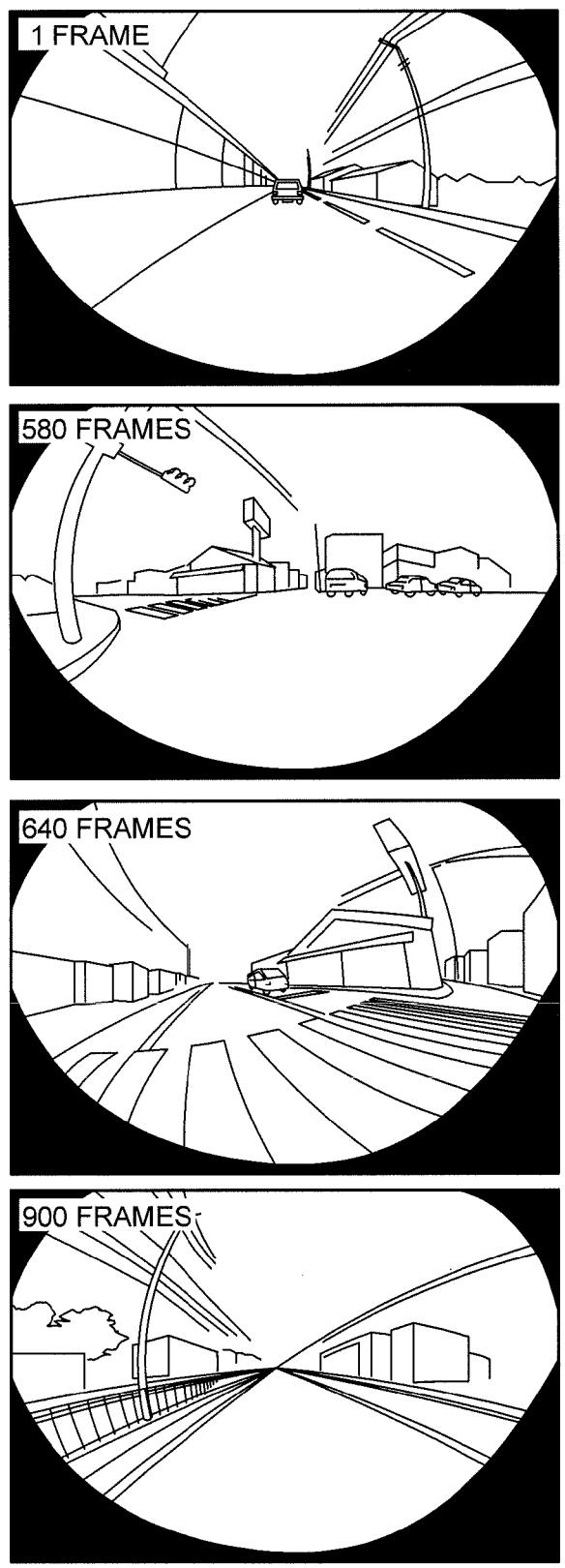
FIG. 7 is a diagram that illustrates an example of the picture captured by the camera.

Next, an explanation is given of each processing unit illustrated in FIG. 3. The camera 10 captures pictures. The camera 10 outputs data on the captured pictures to the image processing unit 202 and the brightness-image converting unit 203. FIG. 7 is a diagram that illustrates an example of a picture captured by the camera.

The steering angle sensor 11 is a sensor that detects the steering angle of the vehicle. The steering angle sensor 11 outputs data on the steering angle to the running-state determining unit 201. The vehicle-speed sensor 12 is a sensor that detects the speed of the vehicle. The vehicle-speed sensor 12 outputs data on the vehicle speed to the running-state determining unit 201.

The running-state determining unit 201 is a processing unit that determines whether the current running state of the vehicle is appropriate for the calculation of the vanishing point by using the data on the steering angle and the vehicle speed. Specifically, the running-state determining unit 201 determines that the current running state of the vehicle is appropriate for the calculation of the vanishing point if the absolute value of the current steering angle is less than the reference steering angle (e.g., 1 degree) and if the absolute value of the current speed is equal to or greater than the reference speed (e.g., 30 km/h).

Conversely, if the absolute value of the current steering angle is equal to or greater than the reference steering angle or if the absolute value of the current speed is less than the reference speed, the running-state determining unit 201 determines that the current running state of the vehicle is not appropriate for the calculation of the vanishing point.

If it is determined that the current running state of the vehicle is appropriate for the calculation of the vanishing point, the running-state determining unit 201 sets a flag in the image-integration averaging processing unit 204 to on. If it is determined that the current running state of the vehicle is not appropriate for the calculation of the vanishing point, the running-state determining unit 201 sets a flag in the image-integration averaging processing unit 204 to off.

The image processing unit 202 is a processing unit that analyzes the picture output from the camera 10 in accordance with the camera parameters stored in the camera-parameter storage unit 212. For example, the image processing unit 202 determines the coordinates of the white line in the image and, if the white line enters a predetermined area of the image, determines that the vehicle has deviated from the traffic lane and gives the user a warning. The image processing unit 202 may detect an obstacle included in the picture and output a crash warning to the user.

Figure 8:
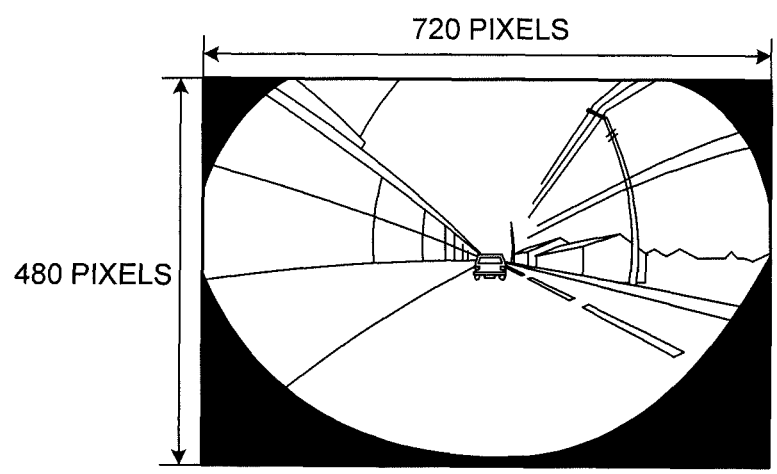
FIG. 8 is a diagram that illustrates an example of a brightness image of 720×480 pixels.

The brightness-image converting unit 203 is a processing unit that converts the picture output from the camera 10 into a brightness image of 720×480 pixels and outputs the converted brightness image to the image-integration averaging processing unit 204. FIG. 8 is a diagram that illustrates an example of a brightness image of 720×480 pixels. Each pixel of the brightness image has 8-bit information (brightness value).

The image-integration averaging processing unit 204 is a processing unit that sequentially acquires a brightness image from the brightness-image converting unit 203 and integrates and averages each brightness image so as to generate an integrated and averaged image. The image-integration averaging processing unit 204 outputs the integrated and averaged image to the lens-distortion correcting unit 205.

The image-integration averaging processing unit 204 integrates brightness images that are acquired from the brightness-image converting unit 203 while the flag is on. The image-integration averaging processing unit 204 does not integrate brightness images that are acquired from the brightness-image converting unit 203 while the flag is off. The image-integration averaging processing unit 204 discards such brightness images.

Figure 9:
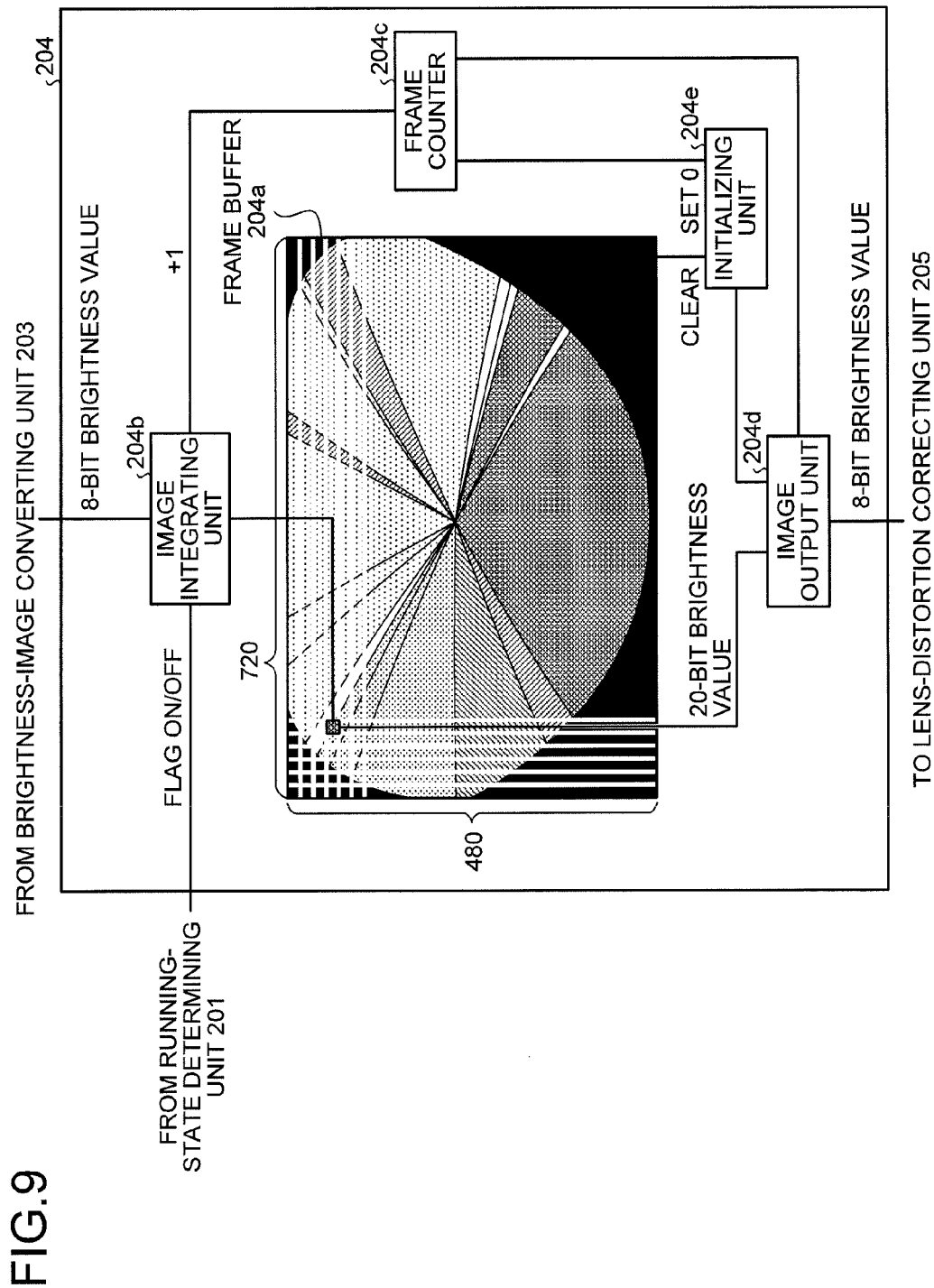
FIG. 9 is a diagram that illustrates the configuration of an image-integration averaging processing unit.

An explanation is given here of the configuration of the image-integration averaging processing unit 204. FIG. 9 is a diagram that illustrates the configuration of the image-integration averaging processing unit 204. As illustrated in FIG. 9, the image-integration averaging processing unit 204 includes a frame buffer 204a, an image integrating unit 204b, a frame counter 204c, an image output unit 204d, and an initializing unit 204e.

The frame buffer 204a is a two-dimensional memory that has 720×480 memory areas. Each memory area of the frame buffer 204a stores 20-bit information.

The image integrating unit 204b is a processing unit that repeats a process with the following steps: acquires a brightness image from the brightness-image converting unit 203, adds each brightness value of the brightness image and each brightness value in the frame buffer 204a, and returns the result of the addition to the corresponding memory area of the frame buffer 204a.

Specifically, the image integrating unit 204b acquires the 20-bit brightness value that is stored in the memory area in the n-th row and the m-th column (n=1 to 480, m=1 to 720) of the frame buffer 204a. The image integrating unit 204b adds the brightness value acquired from the frame buffer 204a and the brightness value (8 bits) of the pixel in the n-th row and the m-th column frame of the brightness image and stores the result of the addition in the memory area in the n-th row and the m-th column of the frame buffer 204a.

The image integrating unit 204b repeats the above-described addition process each time the image integrating unit 204b acquires a brightness image from the brightness-image converting unit 203 while the flag in the image integrating unit 204b is on. The image integrating unit 204b adds one to the number of frames in the frame counter 204c each time the image integrating unit 204b performs the addition process. The vehicle is moving in a straight line while the flag in the image integrating unit 204b is on.

When acquiring a brightness image from the brightness-image converting unit 203 while the flag in the image integrating unit 204b is off, the image integrating unit 204b does not perform the above-described addition process and discards the acquired brightness image. The vehicle is not moving in a straight line while the flag in the image integrating unit 204b is off.

The frame counter 204c is a storage unit that stores the number of integrated frames. The initial value of the frame number stored in the frame counter 204c is set to zero.

The image output unit 204d is a processing unit that, when the frame number in the frame counter 204c becomes 1024, acquires the added value (20 bits) stored in each memory area of the frame buffer 204a and divides each added value by 1024 (shifts to the right by 16 bits) so as to generate an integrated and averaged image. The image output unit 204d outputs the integrated and averaged image to the lens-distortion correcting unit 205. The image output unit 204d outputs a control signal to the initializing unit 204e after the integrated and averaged image is generated.

When obtaining the control signal from the image output unit 204d, the initializing unit 204e sets the information in each memory area of the frame buffer 204a to zero and also sets the frame number in the frame counter 204c to zero.

An explanation is given with reference to FIG. 3 again. The lens-distortion correcting unit 205 is a processing unit that corrects the lens distortion of an integrated and averaged image when acquiring the integrated and averaged image from the image-integration averaging processing unit 204. The lens-distortion correcting unit 205 outputs to the edge extracting unit 206 the integrated and averaged image for which the lens distortion has been corrected.

The lens-distortion correcting unit 205 corrects the lens distortion of the integrated and averaged image so as to convert the projection of the integrated and averaged image into an ideal perspective projection.

Specifically, the lens-distortion correcting unit 205 has a conversion table and, by using the conversion table, corrects an integrated and averaged image. FIG. 10 is a diagram that illustrates a process performed by the lens-distortion correcting unit 205. As illustrated in FIG. 10, the conversion table stores pre-correction coordinates and post-correction coordinates that are related to one another. For example, the pre-correction coordinates x, y in the first line of the conversion table are (10, 2), and the post-correction coordinates x, y are (0, 0).

The lens-distortion correcting unit 205 refers to the first line of the conversion table and shifts the brightness value on the coordinates (10, 2) of the integrated and averaged image to the coordinates (0, 0). The lens-distortion correcting unit 205 also refers to the other lines and shifts the brightness value of the integrated and averaged image to different coordinates so as to correct the integrated and averaged image.

Instead of using the conversion table, the lens-distortion correcting unit 205 may sequentially correct an integrated and averaged image by using lens distortion data that includes the incidence angle and the image height.

The edge extracting unit 206 is a processing unit that acquires from the lens-distortion correcting unit 205 the integrated and averaged image, on which the correction has been performed, and performs a filtering process on the integrated and averaged image so as to generate an edge image that is obtained by extracting the edges from the integrated and averaged image. The edge extracting unit 206 outputs the edge image to the vanishing-point extracting unit 207.

Figure 11:
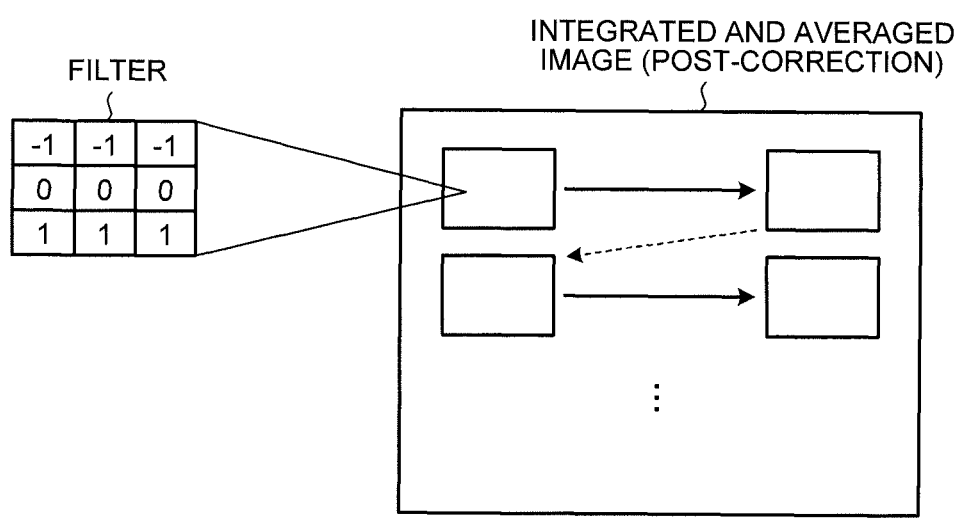
FIG. 11 is a diagram that explains a process performed by an edge extracting unit.

FIG. 11 is a diagram that explains a process performed by the edge extracting unit 206. The edge extracting unit 206 applies a filter to the integrated and averaged image, multiplies each value of the filter by the corresponding brightness value of the integrated and averaged image, and adds each multiplication result. If the result obtained by adding the multiplication results exceeds a certain threshold (e.g., 100), the edge extracting unit 206 sets the brightness value corresponding to the central block of the filter to 128. Conversely, if the result obtained by adding the multiplication results is equal to or less than a certain threshold (e.g., −100), the edge extracting unit 206 sets the brightness value corresponding to the central block of the filter to −128. If the result obtained by adding the multiplication result does not satisfy any one of the conditions, the brightness value corresponding to the central block of the filter is set to 0.

For example, in the area of the integrated and averaged image with which the filter is overlapped, if the brightness value in the a-th row and the b-th column is $B_{ab}$ and if the result obtained by adding the multiplication results is A, the result A is obtained as follows: $A=-1\times B_{11}+-1\times B_{12}+-1\times B_{13}+0\times B_{21}+0\times B_{22}+0\times B_{23}+1\times B_{31}+1\times B_{32}+1\times B_{33}$ If A is plus, for example, equal to or greater than 100, the edge extracting unit 206 sets the brightness value corresponding to $B_{22}$ to 128. If A is minus, for example, equal to or less than −100, the edge extracting unit 206 sets the brightness value corresponding to $B_{22}$ to −128. Otherwise, the edge extracting unit 206 sets the brightness value to 0.

The edge extracting unit 206 moves the filer on the integrated and averaged image and sequentially sets the brightness value of the integrated and averaged image so as to generate an edge image.

An explanation is given here with reference to FIG. 3 again. The vanishing-point extracting unit 207 is a processing unit that acquires an edge image from the edge extracting unit 206 and calculates the coordinates of the vanishing point by using the edge image. The vanishing-point extracting unit 207 connects the sequence of points with the brightness value of 128 included in the edge image by using a straight line so as to calculate a vanishing line. Furthermore, the vanishing-point extracting unit 207 connects the sequence of points with the brightness value of −128 included in the edge image by using a straight line so as to calculate a vanishing line. The vanishing-point extracting unit 207 may use the well-known Hough transform to calculate the vanishing line from the sequence of points.

After calculating the vanishing line, the vanishing-point extracting unit 207 obtains the intersection point of the vanishing lines and determines the coordinates of the obtained intersection point as the coordinates of the vanishing point. The vanishing-point extracting unit 207 outputs the coordinates of the vanishing point to the error determining unit 209. The vanishing-point extracting unit 207 also outputs information on the vanishing lines to the error determining unit 209.

The vanishing-point storage unit 208 is a storage unit that stores therein the coordinates of a reference vanishing point. In the following explanation, the coordinates of the reference vanishing point are described as reference vanishing-point coordinates.

The error determining unit 209 is a processing unit that compares the coordinates of the vanishing point acquired from the vanishing-point extracting unit 207 with the reference vanishing-point coordinates and that determines whether any parameters of the camera 10 are to be readjusted. If the distance between the reference vanishing-point coordinates and the coordinates of the vanishing point acquired from the vanishing-point extracting unit 207 is equal to or greater than a threshold, the error determining unit 209 determines that a parameter needs to be readjusted. If it is determined that a parameter needs to be readjusted, the error determining unit 209 outputs to the HMI 210 and the correction processing unit 211 information that indicates that a parameter needs to be readjusted. Furthermore, the error determining unit 209 outputs the coordinates of the vanishing point to the correction processing unit 211.

The HMI 210 is a processing unit that, when acquiring from the error determining unit 209 the information that indicates that a parameter needs to be readjusted, displays the information that indicates that a parameter needs to be readjusted on a display (not illustrated) via the image processing unit 202.

The correction processing unit 211 is a processing unit that corrects a parameter stored in the camera-parameter storage unit 212 when acquiring from the error determining unit 209 the information that indicates that a parameter needs to be readjusted.

The correction processing unit 211 calculates the deviation of the coordinates of the vanishing point acquired from the error determining unit 209 from the reference vanishing-point coordinates stored in the vanishing-point storage unit 208 and corrects the parameters in accordance with the calculated deviation. Specifically, the correction processing unit 211 calculates the axis-X deviation Xs and the axis-Y deviation Ys of the coordinates of the vanishing point from the reference vanishing-point coordinates in the XY coordinate system (the axis X is the horizontal direction of the image, and the axis Y is the vertical direction of the image).

For example, the correction processing unit 211 calculates the deviation angles $\Delta\psi$, $\Delta\theta$ by using $\Delta\psi=\tan^{-1}(Xs/Lx)$ and $\Delta\theta=\tan^{-1}(Ys/Ly)$. Lx and Ly are the focal lengths of the camera 10.

The correction processing unit 211 corrects the parameters by adding $\Delta\psi$ to the depression angle $\psi$, which is a parameter stored in the camera-parameter storage unit 212, and adding $\Delta\theta$ to the pan angle $\theta$. After the correction of the parameters has been completed, the correction processing unit 211 stores in the vanishing-point storage unit 208 the coordinates of the vanishing point acquired from the error determining unit 209 as reference vanishing-point coordinates. The correction processing unit 211 discards the previous reference vanishing-point coordinates stored in the vanishing-point storage unit 208.

The camera-parameter storage unit 212 is a storage unit that stores the parameters of the camera 10. The camera-parameter storage unit 212 may store therein the three-dimensional coordinates (x, y, z) of the camera 10 in addition to the above-described parameters.

Figure 12:
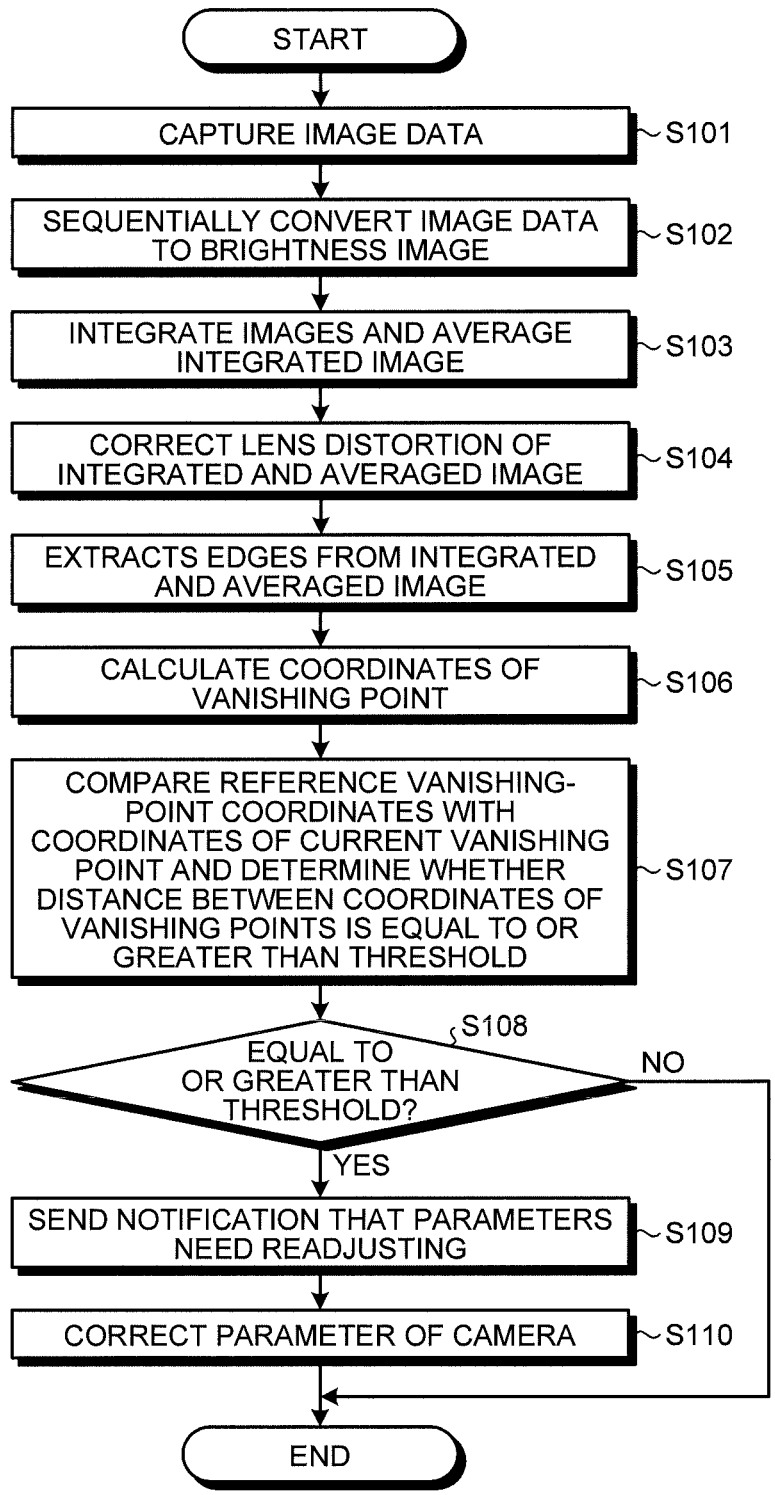
FIG. 12 is a flowchart that illustrates the steps of a process performed by the calibration device.

Next, an explanation is given of the steps of a process performed by the calibration device 200 according to the second embodiment. FIG. 12 is a flowchart that illustrates the steps of the process performed by the calibration device 200. As illustrated in FIG. 12, the calibration device 200 acquires image data from the camera 10 (Step S101) and sequentially converts the image data into a brightness image (Step S102).

The calibration device 200 integrates the images and averages the integrated image (Step S103). The calibration device 200 corrects the lens distortion of the integrated and averaged image (Step S104). The calibration device 200 extracts the edges from the integrated and averaged image (Step S105) and calculates the coordinates of the vanishing point (Step S106).

The calibration device 200 compares the reference vanishing-point coordinates with the coordinates of the current vanishing point and determines whether the distance between the coordinates of the vanishing points is equal to or greater than a threshold (Step S107). If the distance between the coordinates of the vanishing points is less than the threshold (No at Step S108), the calibration device 200 terminates the process.

Conversely, if the distance between the coordinates of the vanishing points is equal to or greater than the threshold (Yes at Step S108), the calibration device 200 sends a notification that the parameters of the camera need to be readjusted (Step S109) and corrects the parameters of the camera (Step S110).

Figure 13:
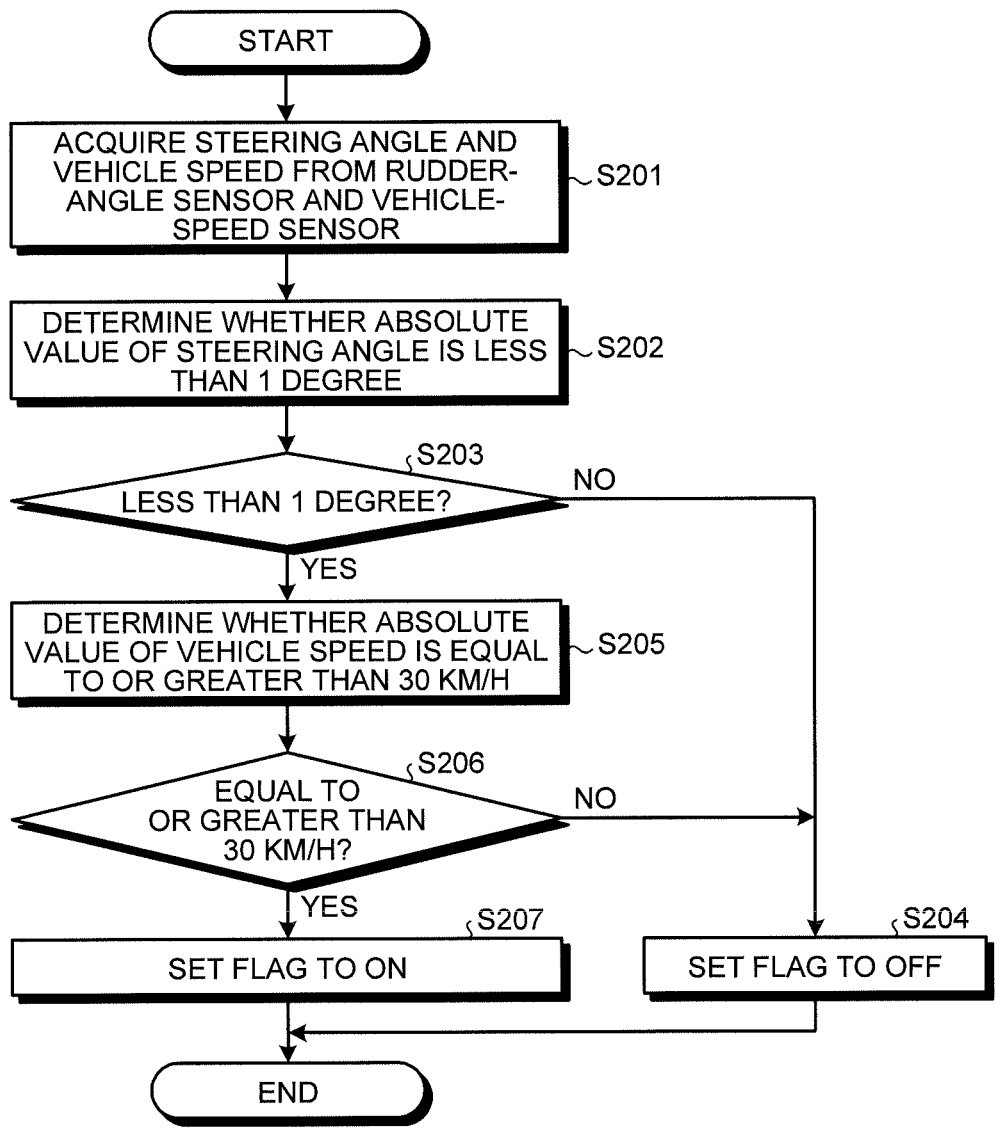
FIG. 13 is a flowchart that illustrates the steps of a process performed by a running-state determining unit.

Next, an explanation is given of the steps of a process performed by the running-state determining unit 201 illustrated in FIG. 3. FIG. 13 is a flowchart that illustrates the steps of a process performed by the running-state determining unit 201. As illustrated in FIG. 13, the running-state determining unit 201 acquires the steering angle and the vehicle speed from the steering angle sensor 11 and the vehicle-speed sensor, respectively (Step S201), and determines whether the absolute value of the steering angle is less than 1 degree (Step S202).

If the absolute value of the steering angle is equal to or greater than 1 degree (No at Step S203), the running-state determining unit 201 sets the flag in the image-integration averaging processing unit 204 to off (Step S204). If the absolute value of the steering angle is less than 1 degree (Yes at Step S203), the running-state determining unit 201 determines whether the absolute value of the vehicle speed is equal to or greater than 30 km/h (Step S205).

If the running-state determining unit 201 determines that the absolute value of the vehicle speed is less than 30 km/h (No at Step S206), the process proceeds to Step S204. Conversely, if it is determined that the absolute value of the vehicle speed is equal to or greater than 30 km/h (Yes at Step S206), the running-state determining unit 201 sets the flag to on (Step S207).

As described above, the calibration device 200 according to the second embodiment integrates/averages an image that is acquired while the vehicle is moving so as to identify the vanishing lines, whereby the vanishing lines of movement can be calculated even in a situation where there is no flat road surface or parallel roadside lines (white lines). Thus, without regard to an actual traffic environment, calibration can be correctly performed after shipment. That is, the parameters of the camera can be accurately corrected without regard to the traffic environment.

Furthermore, the calibration device 200 according to the second embodiment interrupts the integration of images in accordance with the steering angle and the vehicle speed output from the steering angle sensor 11 and the vehicle-speed sensor 12, respectively. Thus, it is possible to prevent the integration of pictures that describe lines that cause misalignment of the vanishing point.

[c] Third Embodiment

An explanation is given so far of the embodiments of the present invention; however, the present invention may be embodied in various different forms other than the first and second embodiments. A different embodiment of the present invention is explained below as a third embodiment.

(1) Determination of Running State

In the second embodiment, the running-state determining unit 201 uses the steering angle sensor 11 and the vehicle-speed sensor 12 to determine whether the vehicle is moving in a straight line; however, the present invention is not limited to this. The running-state determining unit 201 may use other sensors, such as an acceleration sensor or gyroscope to determine the running state of the vehicle.

(2) Configuration of System, and the Like

Among the processes described in the embodiments, all or some of the processes that are automatically performed as described above can be performed manually. All or some of the processes that are manually performed as described above can be performed automatically by using a well-known method. Furthermore, the procedures, the control procedures, the specific names, and the information including various types of data and parameters as described in the specifications and the drawings can be arbitrarily changed except as otherwise noted.

Each of the components of the devices depicted in the drawings is based on a functional concept and does not necessarily need to be physically configured as depicted in the drawings. Specific forms of separation and integration of each device are not limited to the ones depicted in the drawings. It is possible that all or some of them are functionally or physically separated or integrated in an arbitrary unit depending on various types of loads or usage.

For example, a configuration may be such that a server has functions corresponding to the brightness-image converting unit 203, the image-integration averaging processing unit 204, the lens-distortion correcting unit 205, the edge extracting unit 206, the vanishing-point extracting unit 207, the error determining unit 209, the vanishing-point storage unit 208, and the correction processing unit 211, which are illustrated in FIG. 3, and the images captured by the camera or various types of data including the parameters are transmitted to the server so that the server corrects the parameters.

All or any of the processing functions performed by each of the devices can be implemented by a CPU and programs analyzed and executed by the CPU or implemented as wired logic hardware.

Figure 14:
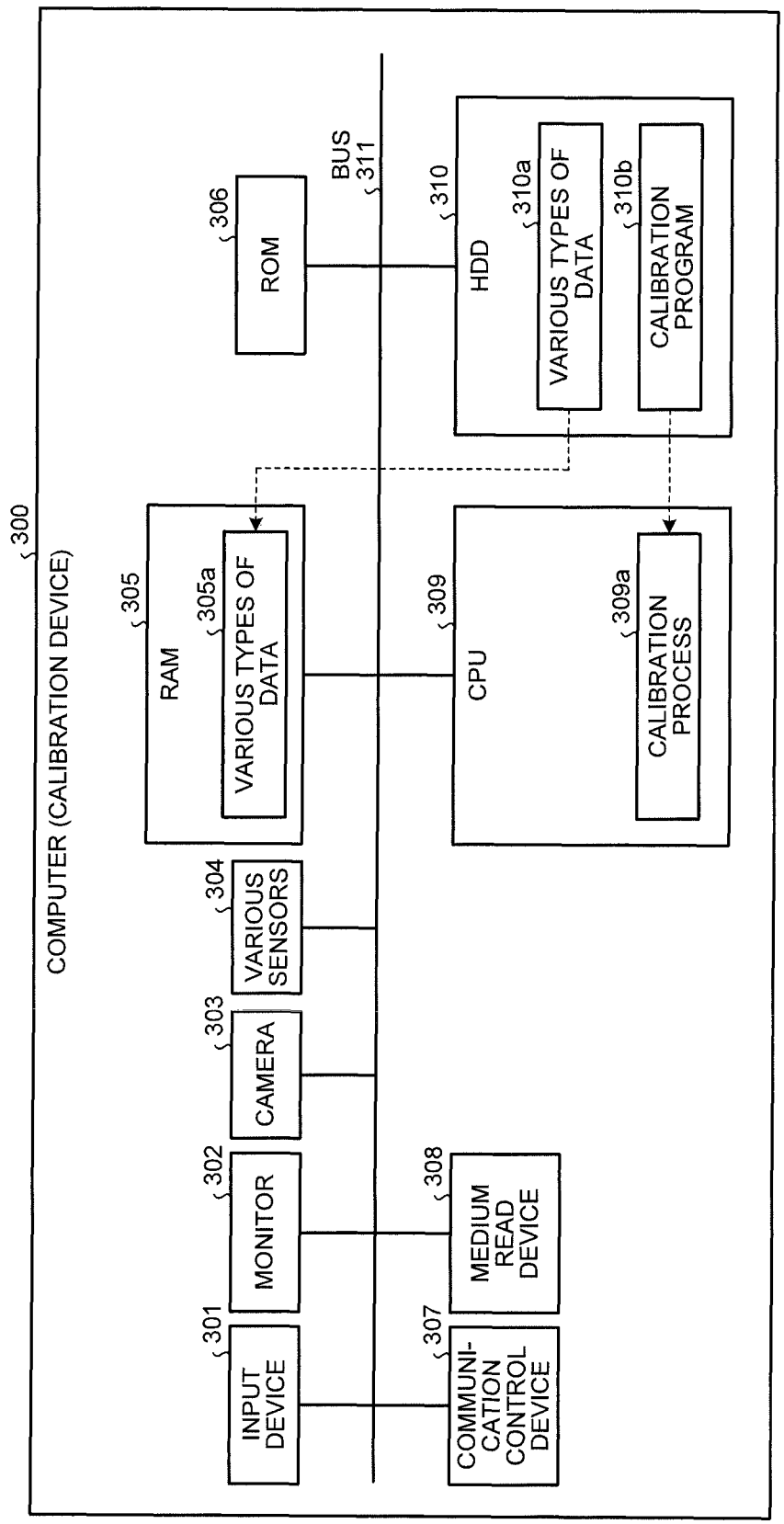
FIG. 14 is a diagram that illustrates the hardware configuration of a computer that includes the calibration device according to the embodiment.

FIG. 14 is a diagram that illustrates the hardware configuration of a computer that includes the calibration device 200 according to the embodiment. As illustrated in FIG. 14, a computer (calibration device) 300 includes an input device 301, a monitor 302, a camera 303, various sensors 304, such as a steering angle sensor or a vehicle-speed sensor, and a Random Access Memory (RAM) 305. The computer 300 further includes a Read Only Memory (ROM) 306, a communication control device 307 that communicates with a different device, a medium read device 308 that reads data from a storage medium, a Central Processing Unit (CPU) 309, and a Hard Disk Drive (HDD) 310. Each of the devices 301 to 310 is connected to a bus 311.

The HDD 310 stores therein a calibration program 310b that performs the same function as that of the above-described calibration device 200. The CPU 309 reads and executes the calibration program 310b so that a calibration process 309a is started. Here, the calibration process 309a corresponds to the running-state determining unit 201, the image processing unit 202, the brightness-image converting unit 203, the image-integration averaging processing unit 204, the lens-distortion correcting unit 205, the edge extracting unit 206, the vanishing-point extracting unit 207, the error determining unit 209, the HMI 210, and the correction processing unit 211, which are illustrated in FIG. 3.

The HDD 310 stores various types of data 310a that correspond to the information stored in the vanishing-point storage unit 208 and the camera-parameter storage unit 212. The CPU 309 reads the data 310a stored in the HDD 310, stores the data 310a in the RAM 305, and corrects the parameters by using the data 305a stored in the RAM 305, the images captured by the camera 303, and the information sent from various sensors 304.

The calibration program 310b illustrated in FIG. 14 dose not need to be stored initially in the HDD 310. For example, the calibration program 310b may be stored in a "portable physical medium", such as a flexible disk (FD), a CD-ROM, a DVD disk, a magneto-optical disk, or an IC card, that is inserted into the computer. The calibration program 310b may be stored in a "fixed physical medium", such as a hard disk drive (HDD), that is arranged inside or outside the computer. Moreover, the calibration program 310b may be stored in "another computer (or server)", or the like, that is connected to the computer via, for example, a public line, the Internet, a LAN, a WAN, or the like. The computer may read the calibration program 310b from it and execute the program.

Without regard to an actual traffic environment, an image processing device according to the present invention can correctly determine when calibration is to be performed after shipment.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An image processing device comprising:
an integrating unit configured to acquire, from a camera installed on a movable body, images that are captured by the camera while the movable body is moving and integrates the acquired images so as to generate an integrated image;
a vanishing-point identifying unit configured to extract brightness edges from the integrated image and identifies an intersection point of lines determined by using the brightness edges as a vanishing point;
a determining unit configured to determine whether a parameter of the camera has an appropriate value by using coordinates of the vanishing point identified and reference coordinates, the reference coordinates being coordinates of a reference vanishing point stored; and
a correcting unit configured to correct the parameter of the camera in accordance with a difference between the coordinates of the vanishing point identified and the reference coordinates.

2. The image processing device according to claim 1, wherein the integrating unit is configured to acquire a moving speed of the movable body from a speed sensor and, while the acquired moving speed is equal to or greater than a predetermined speed, integrates images obtained from the camera so as to generate the integrated image.

3. The image processing device according to claim 2, wherein the integrating unit is configured to acquire a steering angle of the movable body from a steering angle sensor and, while the acquired steering angle is less than a predetermined steering angle, integrates images obtained from the camera so as to generate the integrated image.

4. The image processing device according to claim 1, wherein the integrating unit is configured to acquire the integrated image by adding and averaging the brightness value of the acquired images for each pixel.

5. The image processing device according to claim 1, wherein the parameter of the camera includes a pan angle or a depression angle.

6. An image processing method performed by an image processing device, the image processing method comprising:
acquiring, from a camera installed on a movable body, images that are captured by the camera while the movable body is moving and integrating the acquired images so as to generate an integrated image;
extracting brightness edges from the integrated image and identifying an intersection point of lines determined by using the brightness edges as a vanishing point;
determining whether a parameter of the camera has an appropriate value by using the coordinates of the vanishing point identified and reference coordinates, the reference coordinates being coordinates of a reference vanishing point stored; and
correcting the parameter of the camera in accordance with a difference between the coordinates of the vanishing point identified and the reference coordinates.

7. The image processing method according to claim 6, the integrating includes acquiring a moving speed of the movable body from a speed sensor and, while the acquired moving speed is equal to or greater than a predetermined speed, integrating images obtained from the camera so as to generate the integrated image.

8. The image processing method according to claim 7, the integrating includes acquiring a steering angle of the movable body from a steering angle sensor and, while the acquired steering angle is less than a predetermined steering angle, integrating images obtained from the camera so as to generate the integrated image.

9. An image processing device comprising:
a processor; and
a memory which stores a plurality of instructions, which when executed by the processor, cause the processor to execute:
acquiring, from a camera installed on a movable body, images that are captured by the camera while the movable body is moving and integrating the acquired images so as to generate an integrated image;
extracting brightness edges from the integrated image and identifying an intersection point of lines determined by using the brightness edges as a vanishing point;
determining whether a parameter of the camera has an appropriate value by using the coordinates of the vanishing point identified and reference coordinates, the reference coordinates being coordinates of a reference vanishing point stored; and
correcting the parameter of the camera in accordance with a difference between the coordinates of the vanishing point identified and the reference coordinates.

* * * * *